3,436,187
METHOD OF ESTIMATING THYMOL TURBIDITY EMPLOYING POLYSTYRENE LATEX SUSPENSIONS AS STANDARDS
Patrick V. Ferro, Miami, and Anna B. Ham, Coral Gables, Fla., assignors to Dade Reagents, Inc., Miami, Fla., a corporation of Florida
No Drawing. Filed Mar. 3, 1965, Ser. No. 436,909
Int. Cl. G01n 31/00
U.S. Cl. 23—230                                                2 Claims

ABSTRACT OF THE DISCLOSURE

Latex particle suspensions for use as standards in a method of estimating the thymol turbidity level of human sera. Each of such standards consists of an aqueous suspnesion of monodisperse latex particles of a size falling within the range of 0.3 to 1.5 microns in diameter and having a density no greater than approximately 1.05.

---

This invention relates to thymol turbidity standards, and more specifically, to a suspension particularly suitable in preparing markedly improved standards for use in conducting thymol turbidity tests, and to the standards prepared thereby.

In 1944, Maclagan [in 25 Brit. J. Exp. Path., 234 (1944] reported that a buffer prepared with thymol and barbitone at pH 7.8 produced a marked turbidity or precipitate with certain sera. These sera were usually from patients with parenchymatous liver disease. Since then the thymol turbidity test has been used as an indicator of liver dysfunction.

In order to determine the extent of liver damage an arbitrary set of units were proposed by Maclagan based on standards published by Kingsbury, Clark, Williams, and Post in 11 J. Lab. Clin. Med., 981 (1927). These standards, sometimes known as the Kingsbury standards, were prepared by treating gelatin and egg albumin with formalin to form a firm gel having various degrees of turbidity.

The preparation of these standards presented many problems. For one thing, considerable difficulty was frequently encountered in developing the correct degree of turbidity before gelation occurred. Also, such standards tended to discolor on standing and, in any case, were useful only for making visual comparisons; they could not be used in colorimeters or spectrophotometers.

In an effort to overcome some of these problems, Shank and Hoagland in 1946 introduced the use of a barium sulfate suspension for measuring turbidity of bacterial suspensions as a basis of thymol turbidity standardization [162 J. Biol. Chem., 133 (1946)]. Such barium sulfate standards were prepared by mixing a solution of barium chloride with chilled (10° C.) dilute sulfuric acid to form insoluble barium sulfate and using the degree of turbidity formed by the insoluble barium sulfate as a means of standardizing the thymol turbidity unit. The degrees of turbidity of barium sulfate standards were adjusted to match those proposed by Maclagan.

While barium sulfate standards are still commonly used, they are not without substantial shortcomings or disadvantages. As a recommended procedure, such standards should be freshly prepared each time they are to be used. At most, such standards are usable for only two or three days before they must be discarded. Barium sulfate standards tend to settle quite rapidly from solution (within less than five minutes), making it imperative that the tubes be constantly agitated to uniformly re-suspend the precipitate so that correct absorbance readings can be made. Also, after one or two days of standing the particle size of such a barium sulfate standard changes so that later readings are different from those of the standards when freshly prepared. Thus, barium sulfate suspensions are characterized by a lack of stability which greatly impairs their usefulness as thymol turbidity standards.

Recognizing the problems inherent in the preparation and use of barium sulfate standards, Reinhold in 1955 [27 Anal. Chem., 239 (1955)] proposed the use of colloidal glass suspension to replace the barium sulfate standards. Such a preparation was made by agitating fragments of borosilicate glass in water until an even milky suspension was formed. However, this process was found difficult with respect to reproducing particles of uniform size and, in general, has not been adopted for widespread use because of the new problems which were created.

Accordingly, it is an object of the present invention to provide an effective thymol turbidity standard which overcomes the aforementioned defects and disadvantages of prior standards. Specifically, it is a primary object of the present invention to provide a suspension which is easily prepared, readily reproducible, and highly stable, and which is particularly suitable for use as a standard in conducting thymol turbidity tests.

Another object of the invention is to provide a standard which duplicates the commonly-used barium sulfate standards and which, at the same time, overcomes the problems of instability and the difficulties of preparation connected with barium sulfate standards. Another object is to provide a standard in which the particle size remains constant and is not affected by temperature changes. Another object is to provide a standard in which the particles, unlike barium sulfate particles, will not settle rapidly from solution, such rapid settling making the recording of percent transmittance or optical density in a colorimeter or spectrophotometer difficult.

A still further object of the invention is to provide a method for preparing a superior standard for use in estimating the thymol turbidity level in human sera. Other objects and advantages will appear as the specification proceeds.

A main aspect of the invention lies in the discovery that the results of a freshly-prepared barium sulfate standard may be duplicated by a suspension of finely-divided latex particles in water, the latex suspension, unlike the barium sulfate suspension, being relatively stable and easily prepared. It has also been found that such advantages, including a duplication of the results obtained with a freshly-prepared barium sulfate suspension, are achieved only when the latex particles of the standard fall within a certain predetermined size range.

In general, the monodisperse latex particles should be of a diameter falling within the range of 0.3 to 1.5 microns. In order to achieve the same light transmittance properties as a barium sulfate standard, and to obtain a high degree of suspension stability, the preferred range of latex particle sizes is 0.6 to 1.0 micron in diameter, with the optimum average particle size closely approximating 0.8 micron in diameter.

The latex particles are formed of polystyrene having a density approximately the same as that of water. Specifically, the density of such particles is 1.05. While polystyrene is preferred because of its stability and density, other materials having similar properties, such as polyvinyltoluene (having a density of 1.027) may also be used in the particle size ranges indicated.

It has been found that particle sizes substantially less than 0.6 micron tend to form colloids when added to water, whereas particle sizes substantially larger than 1.0 micron tend to settle rapidly. In either case, such dispersions are unsatisfactory for use as standards for estimating the level of thymol turbidity of human sera. It has been found that dispersions of the smaller and larger particle sizes do not exhibit the same light transmittance properties as freshly-prepared barium sulfate standards when tested with certain conventional spectrophotometric equipment.

"Stability," as used herein, refers not only to the dispersion itself, in which the particles tend to remain in suspension for relatively long periods of time, but also to the dimensional stability of each particle. A change in particle size, as occurs in barium sulfate particles after a period of about two days, alters the reflectance characteristics of the standard and renders it unsuitable for use as a reliable comparison. It has been found that there is no detectable change in particle size of a monodisperse polystyrene latex over a test period of six months and that such particles remain of constant size over the full range of temperatures encountered in laboratory use of such a standard. As far as the stability of the standard itself is concerned, it has been found that a polystyrene latex having particle sizes within the range of 0.6 to 1.0 micron will remain stable, that is, the particles will remain in suspension, for six months or more. Should some settling of particles occur after the standard has been left undisturbed for longer periods, the settled particles can be readily re-suspended by merely inverting the aqueous suspension to restore the original condition. Even where slight settling of particles has occurred, the resuspension of such particles by inversion restores the original light-transmittancy properties of the standard.

In view of the above, it is believed apparent that the polystyrene latex particle suspension remains dispersed in water for long periods with little or no settling of the particles, and no change in the size of such particles or in the light-transmittancy properties of the standard, and since such a standard can be prepared with the same optical properties as a freshly-prepared barium sulfate suspension, the standard of the present invention is highly suitable for use as a permanent standard for use in estimating the thymol turbidity level of human sera.

Example

A sample preparation of thymol turbidity standards using the polystyrene latex particles is prepared as follows: Approximately 0.5 ml. of a 10 percent suspension of latex particles having a diameter of 0.6 to 1.0 micron and a density of approximately 1.05 is added to 1000 ml. of distilled water. An aliquot of this suspension is then transferred to a test tube (or cuvet), placed in a colorimeter or spectrophotometer (such as the Coleman Jr. Spectrophotometer marketed by Coleman Instruments, Inc., Maywood, Ill.), and the percent transmittance or optical density is adjusted by the addition of water or additional latex particles so that the observed readings coincide with that of a 20 mg. barium sulfate standard prepared as specified by Shank and Hoagland.

The Shank-Hoagland barium sulfate standards are prepared by cooling a 0.2 N sulfuric acid solution to a temperature of 10° C. and then adding such solution, wtih agitation, to 5 ml. of a barium chloride solution (0.0962 N) in a 100 ml. volumetric flask. The acid is added to make a total volume of 100 ml., and the flask is inverted to mix the reactants thoroughly and to produce the barium sulfate stock solution.

Aliquots of the barium sulfate stock solution are then mixed with 0.2 N sulfuric acid (not chilled) in $19 \times 150$ mm. cuvets in the following proportions:

| Barium Sulfate Stock Standard, ml. | Sulfuric Acid 0.2 N, ml. | Shank-Hoagland Thymol Units |
|---|---|---|
| 0 | 10.00 | [1] 0 |
| 1.35 | 8.65 | 5 |
| 2.70 | 7.30 | 10 |
| 4.05 | 5.95 | 15 |
| 5.40 | 4.60 | 20 |

[1] Control.

In preparing a standard thymol turbidity curve, the samples should be read at a wavelength of 640–660 mu. Using the Control tube, adjust for 100 percent transmittance or zero optical density.

As stated above, an aliquot of the polystyrene latex particle suspension is placed in a colorimeter of spectrophotometer and the percent transmittance or optical density is adjusted so that the observed reading coincides with that of a 20 ml. barium sulfate standard of Shank-Hoagland. Once the polystyrene latex suspension is adjusted so that the percentage transmittance or optical density readings are identical to those of the barium sulfate standard, dilutions with water are made to prepare the 15, 10, and 5 unit thymol turbidity standards.

These diluted standards give the same percentage transmittance or optical density readings when compared to freshly-prepared 15, 10 and 5 unit barium sulfate thymol turbidity standards as recommended by Shank and Hoagland.

Below is a table showing how the percentage transmittance readings of the polystyrene latex, 20 unit standard, diluted with water to represent 15, 10, and 5 units when campared to freshly-prepared 20, 15, 10 and 5 unit barium sulfate standards. Such comparisons were made on a Leitz colorimeter, a Coleman spectrophotometer, and a Coleman Universal spectrophotometer.

| | Coleman Jr. (660 mu.) | | Coleman Universal (660 mu.) | | Leitz (640 mu.) | |
|---|---|---|---|---|---|---|
| | Standards | | Standards | | Standards | |
| | Barium Sulfate, Percent Trans. | Latex Particles, Percent Trans. | Barium Sulfate, Percent Trans. | Late Particles, Percent Trans. | Barium Sulfate, Percent Trans. | Latex Particles, Percent Trans. |
| Units: | | | | | | |
| 5 | 82 | 82 | 63 | 63 | 80 | 80 |
| 10 | 67 | 67 | 40 | 40 | 64 | 64 |
| 15 | 55 | 55 | 25 | 25 | 51 | 51 |
| 20 | 45 | 45 | 16 | 16 | 41 | 41 |

It can be seen from the above table that the polystyrene latex particles give identical percentage transmittance readings as the barium sulfate using three different instruments. No detectable variations from the readings presented in the above table were found in periodic checks made over a six month period.

As set forth in detail in the above example, the preparation of a thymol turbidity standard embodying the present invention involves the steps of first preparing an aqueous suspension of monodisperse polystyrene latex particles of a size falling within the range of 0.3 to 1.5 microns, or the preferred range of 0.6 to 1.0 micron, and thereafter diluting aliquot portions of said suspension to give the same light transmittance readings as a set of freshly-prepared barium sulfate standards. The stable monodisperse polystyrene laxer standards may then be used as stable standards for estimating the thymol turbidity level in human sera, either by visual comparison or by the use of a colorimeter or spectrophotometer.

While in the foregoing we have disclosed an embodiment of the invention in considerable detail for purposes of illustration, it will be understood that many of these details may be varied without departing from the spirit and scope of the invention.

We claim:
1. The method of estimating the thymol turbidity level of human sera comprising the steps of diluting aliquot portions of an aqueous suspension of monodisperse polystyrene latex particles, said particles having density no greater than approximately 1.05 and having a size falling within the range of approximately 0.3 to 1.5 microns in diameter, to provide suspensions having the same light transmittance or optical density properties as a set of freshly prepared conventional barium sulfate standards, and thereafter estimating the thymol turbidity level of human sera, mixed with thymol buffer, by comparing the same with the polystyrene latex suspensions.

2. The method of claim 1 in which said particles are of a size falling within the range of 0.6 to 1.0 micron in diameter.

References Cited

Shank: Hoagland, J. Biol. Chem. vol. 162, 1946, pp. 133–138.

Singer: Amer. J. Med. vol. 21, December 1956, pp. 888–892.

Halberstam: PSGBM, vol. 118, February 1965, pp. 319–323.

ALBERT T. MEYERS, *Primary Examiner.*

A. FAGELSON, *Assistant Examiner.*

U.S. Cl. X.R.

252—408; 424—2